(12) United States Patent
Fontenot, III et al.

(10) Patent No.: US 8,962,723 B2
(45) Date of Patent: *Feb. 24, 2015

(54) DURABLE SUBSTRATE COATING AND PROCESS FOR MAKING

(75) Inventors: Arthur Joseph Fontenot, III, Baton Rouge, LA (US); John Paul Krug, Painted Post, NY (US)

(73) Assignee: Lion Copolymer Geismar, LLC, Geismar, LA (US)

(*) Notice: Subject to any disclaimer, the term of this patent is extended or adjusted under 35 U.S.C. 154(b) by 404 days.

This patent is subject to a terminal disclaimer.

(21) Appl. No.: 13/525,224

(22) Filed: Jun. 15, 2012

(65) Prior Publication Data

US 2012/0322913 A1   Dec. 20, 2012

Related U.S. Application Data

(60) Provisional application No. 61/497,322, filed on Jun. 15, 2011.

(51) Int. Cl.
| | | |
|---|---|---|
| *C08K 5/15* | (2006.01) | |
| *C08K 5/00* | (2006.01) | |
| *C08K 5/101* | (2006.01) | |
| *C08K 5/1515* | (2006.01) | |
| *C08J 3/22* | (2006.01) | |
| *C08K 3/00* | (2006.01) | |

(52) U.S. Cl.
CPC ............ *C08K 5/0008* (2013.01); *C08K 5/0016* (2013.01); *C08K 5/101* (2013.01); *C08K 5/1515* (2013.01); *C08J 3/22* (2013.01); *C08J 2323/16* (2013.01); *C08K 3/0033* (2013.01)
USPC ........................... 524/114; 524/306; 524/526

(58) Field of Classification Search
CPC .... C08K 5/0016; C08K 5/101; C08K 5/1515; C08L 23/16
USPC .......................................... 524/114, 306, 526
See application file for complete search history.

(56) References Cited

U.S. PATENT DOCUMENTS

| | | |
|---|---|---|
| 2,384,543 A | 9/1945 | Fryling |
| 4,076,769 A | 2/1978 | Watts |
| 4,104,323 A | 8/1978 | Hansen |
| 4,213,888 A | 7/1980 | Karg et al. |
| 5,093,407 A | 3/1992 | Komai et al. |
| 5,304,591 A | 4/1994 | Nowakowsky et al. |
| 5,504,168 A | 4/1996 | Maestri et al. |
| 5,763,388 A | 6/1998 | Lightsey et al. |
| 5,985,953 A | 11/1999 | Lightsey et al. |
| 6,197,384 B1 | 3/2001 | Schubert et al. |
| 6,346,579 B1 | 2/2002 | Zanzig et al. |
| 6,403,693 B2 | 6/2002 | Materne et al. |
| 6,579,929 B1 | 6/2003 | Cole et al. |
| 6,635,700 B2 | 10/2003 | Cruse et al. |
| 6,921,785 B2 | 7/2005 | Campbell et al. |
| 7,335,807 B2 | 2/2008 | Hochgesang |
| 7,585,914 B2 | 9/2009 | Tsou et al. |
| 2004/0071626 A1 | 4/2004 | Smith et al. |
| 2005/0020740 A1* | 1/2005 | Matsunaga et al. ........... 524/261 |
| 2005/0256267 A1 | 11/2005 | Hochgesang |
| 2006/0100320 A1 | 5/2006 | Dalphond et al. |
| 2007/0106024 A1 | 5/2007 | Tsou et al. |
| 2007/0260005 A1 | 11/2007 | Karato et al. |
| 2008/0221274 A1 | 9/2008 | Jourdain |
| 2008/0269388 A1* | 10/2008 | Markovich et al. ........... 524/210 |
| 2008/0293889 A1 | 11/2008 | Obrecht |
| 2009/0124730 A1 | 5/2009 | Matsuda et al. |
| 2009/0137716 A1 | 5/2009 | Furukawa et al. |
| 2010/0022684 A1 | 1/2010 | Wallen et al. |
| 2011/0165356 A1 | 7/2011 | Harris et al. |
| 2011/0166262 A1 | 7/2011 | Harris et al. |
| 2011/0166263 A1 | 7/2011 | Rikhoff et al. |
| 2011/0166265 A1 | 7/2011 | Harris et al. |

FOREIGN PATENT DOCUMENTS

| | | |
|---|---|---|
| CA | 1242832 | 10/1988 |
| CA | 2724798 | 1/2010 |
| JP | 2005-33019 | 12/2005 |

* cited by examiner

*Primary Examiner* — Peter D Mulcahy
(74) *Attorney, Agent, or Firm* — Buskop Law Group, PC; Wendy Buskop

(57) ABSTRACT

A durable substrate coating and a process of making include a resin master batch. The resin master batch can include ethylene propylene diene with a polymethylene backbone, mineral spirits, fillers, a de-tackifier, a curative, an activator component, and a metal dryer. The process can include adding the mineral spirits to: the ethylene propylene diene, a plasticizer, and the de-tackifier, and blending to form a solution. The process can include adding the fillers, a light stabilizer, a rheology modifier, and a pigment to the solution, forming a first mixture. The process can include adding another rheology modifier, another light stabilizer, an antioxidant, and a curative to the first mixture, forming a second mixture. The process can include mixing the second mixture to homogenously disperse each ingredient while maintaining a temperature of 60 degrees Celsius to prevent the mineral spirits from flashing.

41 Claims, No Drawings

DURABLE SUBSTRATE COATING AND PROCESS FOR MAKING

CROSS REFERENCE TO RELATED APPLICATIONS

The current application claims priority and the benefit of U.S. Provisional Patent Application Ser. No. 61/497,322 filed on Jun. 15, 2011, entitled "DURABLE SUBSTRATE COATING AND PROCESS FOR MAKING." This reference is incorporated herein in its entirety.

FIELD

The present embodiments generally relate to a durable substrate coating and a process for making the same.

BACKGROUND

A need exists for a coating composition that can provide an impermeable layer to a substrate with a single coat.

A need exists for a coating that can withstand rain and other weather conditions without washing away, in contrast to acrylic coatings.

A need exists for a coating with improved elasticity to accommodate for the movement of the underlying subsurface.

A need exists for a coating that can adhere onto rusted metals.

A need exists for a coating for metal roofs, flat roofs of buildings, bitumen based shingles, tanks, vessels in chemical plants, metal bridges, support structures in chemical plants, stairs, catwalks, and structures that hold vessels in place.

A need exists for a coating that can function as a rubberized paint on objects.

The present embodiments meet these needs.

BRIEF DESCRIPTION OF THE DRAWINGS

N/A

DETAILED DESCRIPTION OF THE EMBODIMENTS

Before explaining the present coating and process in detail, it is to be understood that the coating and process are not limited to the particular embodiments and that the embodiments can be practiced or carried out in various ways.

The present embodiments generally relate to a durable substrate coating having a peel adhesion ranging from about 100 pounds per linear inch (pli) to 1,500 pli on various substrates.

The durable substrate coating can be applied to various substrates, such as rusted metals, metal roofs, flat roofs of buildings, bitumen based shingles, tanks, vessels in chemical plants, metal bridges, support structures in chemical plants, stairs, catwalks, structures that hold vessels in place, hulls of ships, pipes, and other products requiring resistance to corrosion and weathering.

The durable substrate coating can have a strong adhesion to rusty metals without requiring the use of a primer before application of the durable substrate coating.

In one or more embodiments, a single coat of the durable substrate coating can provide an impermeable coating layer to the underlying substrate. For example the durable substrate coating can be impermeable to rain, ponded water, dirt, dust, and other contaminants.

The durable substrate coating can have resistance to ultraviolet (UV) radiation, and can have a low moisture permeability; making the durable substrate coating useful as a roofing membrane.

The durable substrate coating can be applied as a liquid directly over an existing roof with a pre-existing ethylene propylene diene monomer coating that would otherwise require removal and replacement with another coating; thereby making aftermarket repairs of roof coatings easier and more cost effective.

The durable substrate coating can be applied as a liquid directly onto substrates. The durable substrate coating can be at least partially elastic to accommodate for the movement of the underlying subsurface.

One or more embodiments of the durable substrate coating can have a thickness of about 10 millimeters.

The durable substrate coating can also have the following chemical/physical properties: a tensile strength of about 300 psi, a tear strength of about 48 pound-feet/inch (lbf/in), an elongation of about 56 percent, a tack time of about 5 hours, and a cure time of about 12 hours.

The durable substrate coating can include from about 90 weight percent (wt/%) to about 98 weight percent of a resin master batch.

The remaining 0.01 weight percent to 10 weight percent of the durable substrate coating can be a cross-linking catalyst, such as a metal dryer.

The resin master batch can include from about 15 weight percent to about 50 weight percent of ethylene propylene diene terpolymer (EPDM) with a polymethylene backbone, also referred to as Trilene 65™ available from Lion Copolymer, LLC of Baton Rouge, La.

The ethylene propylene diene terpolymer with the polymethylene backbone can have the following chemical formula: $-[(CH_2-CH_2)_x-(CH-CH_3-CH_2)_y-(diene)_z]_n$. Within the chemical formula, n is the degree of polymerization. Within the chemical formula x, y, and z represent the number of ethylene, propylene, and diene units.

The diene can be ethylidene norbornene (ENB), dicyclopentadiene (DCPD), vinyl norbornene (VNB), or 1,4-hexadiene.

The ethylene propylene diene terpolymer with the polymethylene backbone can have a viscosity ranging from about 10 pascal-seconds (Pa-s) to about 10,000 Pa-s at a temperature of 40 degrees Celsius. The ethylene propylene diene terpolymer with the polymethylene backbone can have a viscosity ranging from about 1 Pa-s to about 1,000 Pa-s at a temperature of 100 degrees Celsius.

The ethylene propylene diene terpolymer with the polymethylene backbone can have a specific gravity ranging from about 0.83 to about 0.86, with water as the reference substance.

The diene content of the ethylene propylene diene terpolymer can range from about 0.1 weight percent to about 12 weight percent.

The ratio of ethylene to propylene in the ethylene propylene diene terpolymer can range from about 35:65 to about 80:20.

The ethylene propylene diene terpolymer can be liquid ethylene propylene diene terpolymer with a low molecular weight, such as a molecular weight ranging from about 10 kiloDaltons (kDa) to about 100 kDa; thereby allowing for a high solids content in the durable substrate coating and reducing the need for volatile organic compounds (VOCs) in the durable substrate coating.

The resin master batch can include from about 25 weight percent to about 50 weight percent of a solvent.

The solvent can be mineral spirits, another hydrocarbon solvent, an aromatic solvent, a low volatile organic compound solvent, or combinations thereof.

The mineral spirits can have a low viscosity oil, allowing components of the durable substrate coating to evenly disperse therein and reducing an overall viscosity of the durable substrate coating. One or more embodiments can include 33 weight percent of the mineral spirits.

The low viscosity oil can be highly-hydrotreated white oil, solvent-refined paraffinic oil, naphthenic oil, poly-alpha olefins, another low volatility hydrocarbon oil, or combinations thereof.

The mineral spirits can be naphthenic base, aliphatic hydrocarbons, aromatic hydrocarbons, toluene, xylene, Oxsol 100™, paraplurobenzyl trifloride, or combinations thereof. One or more embodiments of the mineral spirits can include small amounts of oxygenated or halogenated solvents of appropriate volatility to suit the application conditions of the coating.

The resin master batch can include from about 25 weight percent to about 50 weight percent of fillers. The fillers can be kaolin clay, calcined clay, talc, whiting, calcium carbonate, dolomite, calcium magnesium carbonate, silica, precipitated silica, amorphous silica, titanium dioxide, or combinations thereof.

The fillers can function to prevent the durable substrate coating from having too low of a viscosity, and from having a consistency similar to a gelatin. The fillers can provide strength, resistant to breaking, abrasion resistance, and resistance to tearing to the durable substrate coating.

The resin master batch can include from about 0.01 weight percent to about 2 weight percent of a de-tackifier. The de-tackifier can be a fluid that can rise to the surface of the durable substrate coating to prevent oxygen from interacting with other components of the durable substrate coating; thereby preventing the softening of an outside surface of the durable substrate coating. For example, the de-tackifier can be Dow Corning 200™ fluid or the like. The de-tackifier can provide a non-greasy tactile feel on the outside surface of the durable substrate coating.

The durable substrate coating can include from about 0.1 weight percent to about 10 weight percent of a curative. The curative can be terbutyl peroxy benzoate peroxide (Varox TBPB peroxide) blended with 1,6-hexane diacrylate as an activator, also called Sartomer 238™.

The terbutyl peroxy benzoate peroxide can initiate cross-linking in the resin master batch by generating free radicals. Then the Sartomer 238™ can use the radicals to form cross-links in the ethylene propylene diene terpolymer. The Sartomer 238™ is available from Sartomer USA, LLC of Exton, Pa.

The durable substrate coating can include from about 0.5 weight percent to about 10 weight percent of a metal dryer. The metal dryer can be cobalt naphthenate, which can have a purple color, or a transition metal alkylate. The metal dryer can function to speed up the reaction of the terbutyl peroxy benzoate peroxide with the activator or coagent and ethylene propylene diene terpolymer.

The metal dryer can be configured to be mixed with the resin master batch before application of the durable substrate coating.

The durable substrate coating can include from about 0.5 weight percent to about 10 weight percent of an activator component that has less color than the metal dryer. In one or more embodiments, from 0.1 weight percent to 10 weight percent of the activator component can be zinc 2-ethyl-hexoate, such as Octoate Z™ available from R. T. Vanderbilt Company, Inc. of Norwalk, Conn.

In one or more embodiments, from about 0.01 weight percent to about 10 weight percent of the activator component can be zinc octoate or bismuth octoate, which can provide a through cure in the absence of oxygen while acting as the metal dryer. The activator component can function to provide adequate cross-linking in thicker coatings where oxygen concentration may be limited.

One or more embodiments of the durable substrate coating can include from about 25 weight percent to about 50 weight percent of hydrocarbon mineral spirits, such as aliphatic mineral spirit, aromatic mineral spirits, xylene, or solvents of appropriate volatility for the application conditions. The hydrocarbon mineral spirits can function to lower viscosity of the durable substrate coating and provide faster tack-free times after application of the durable substrate coating.

One or more embodiments of the resin master batch can include from about 0.1 weight percent to about 20 weight percent of plasticizers. The plasticizers can be highly-hydrotreated white oil, solvent-refined paraffinic oil, naphthenic oils, poly-alpha olefins, another low volatility hydrocarbon oil, or combinations thereof.

The plasticizers can provide a softer durable substrate coating, allowing for elongation to the durable substrate coating and the underlying substrate without breaking the underlying substrate or damaging the underlying substrate. For example, the plasticizers can allow for elongation of the durable substrate coating during thermal expansion of the underlying substrate and/or the durable substrate coating.

The plasticizers can also reduce the viscosity of the durable substrate coating prior to curing of the durable substrate coating; thereby reducing the need for the use of volatile organic compounds during application of the durable substrate coating. For example, the plasticizers can reduce the viscosity of the durable substrate coating to provide improved coating smoothness upon application or permit spraying of the coating.

One or more embodiments of the resin master batch can include from about 0.1 weight percent to about 2.5 weight percent of light stabilizers. The light stabilizers can function to prevent damage to the durable substrate coating due to electromagnetic radiation.

The light stabilizers can be hindered amine light stabilizers, benzophenone competitive absorption light stabilizers, benzotriazole competitive absorption light stabilizers, or combinations thereof.

Also, such as for indoor applications, the light stabilizers can be titanium dioxide, such as 8400 grade titanium dioxide, or zinc oxide.

The resin master batch can include from about 0.01 weight percent to about 1 weight percent of antioxidants. The antioxidants can be polymerized 1,2-dihydro-2,2,4-trimethylquinoline (TMQ) or 4,4' bis($\alpha,\alpha$-dimethylbenzyl) diphenylamine. The antioxidants can provide a resistance to oxidation to the durable substrate coating.

The resin master batch can include from about 0.1 weight percent to about 5 weight percent of a rheology modifier, which can be pre-dissolved in toluene in a 1:1 ratio. The rheology modifier can be MPA 1078X™, an_anti-settling additive for solvent-borne systems made by Elementis of Hightstown, N.J. The rheology modifier can be Tween 85™ made by ICI Americas, of Wilmington, Del., a polyethylene glycol sorbitan trioleate. The rheology modifier can be any other rheology modifier.

The rheology modifier can maintain other components of the durable substrate coating in suspension and enhance dispersion of solid additives within the durable substrate coating, such as the fillers. For example, the rheology modifier can prevent the fillers from settling out from the durable substrate coating.

The resin master batch can include from about 0.01 weight percent to about 20 weight percent of a pigment. The pigment can be a brightener or a fluorescing component. The pigment can also be an ultramarine blue pigment that acts as a brightener or titanium dioxide.

One or more embodiments relate to a process for making the durable substrate coating.

The process can include adding from about 25 weight percent to about 50 weight percent of the mineral spirits to: from about 15 weight percent to about 50 weight percent of the ethylene propylene diene having the polymethylene backbone, along with from about 0.1 weight percent to about 20 weight percent of the plasticizer, and from about 0.5 weight percent to about 2 weight percent of the de-tackifier, and then blending to form a solution.

The process can include adding from about 20 weight percent to about 50 weight percent of the fillers, from about 0.1 weight percent to about 2.5 weight percent of a first light stabilizer, from about 0.1 weight percent to about 0.5 weight percent of a first pre-dissolved rheology modifier, and from about 0.01 weight percent to about 20 weight percent of a pigment into the solution; thereby forming a first mixture.

The process can include adding from about 0.1 weight percent to about 5 weight percent of a second pre-dissolved rheology modifier, from about 0.1 weight percent to about 2.5 weight percent of a second light stabilizer, an antioxidant, and a curative to the first mixture; thereby forming a second mixture.

The process can include thoroughly mixing the second mixture to homogenously disperse each ingredient in the second mixture, and using a cooler to maintain the second mixture at a temperature of about 60 degrees Celsius to prevent the mineral spirits from flashing. The cooler can be a heat exchanger or a thermal blanket.

Example 1

Components of a Batch of Durable Substrate Coating Material

A first component of an exemplary batch of the durable substrate coating can include 3,480.00 grams of Trilene 65™, 1,044.00 grams of Ultra 1199™ oil (a highly hydrotreated white oil), 1,392.00 grams of titanium dioxide as a light stabilizer, 2,262.00 grams of Burgess Optiwhite Clay™ as a filler, 261.00 grams of zinc oxide as a light stabilizer, and 174.00 grams of a 40 percent solution of MPA 1078X™.

The 40 percent solution of MPA 1078X™ can be formed by dissolving 2.5 grams of MPA 1078X™ in 2.5 grams of tolulene.

The batch of the durable substrate coating of Example 1 can also include 10.44 grams of trimethyl quinoline, 17.40 grams of Lowlight™ 26 (also referred to as Songsorb 3260™) a benzotriazole light stabilizer, 17.40 grams of Lowlight 77™ (also referred to as Songsorb 7700™) a hindered amine light stabilizer, 34.80 grams of Tween 85™ as a rheology modifier, 261.00 grams of Sartomer 238™ as a curative, 13.92 grams of ultramarine blue 5008 as a pigment, 4,384.80 grams of odorless mineral spirits, 34.80 grams of Dow Corning 200™ fluid as a de-tackifier, and 34.80 grams of terbutyl peroxy benzoate peroxide as a curative.

A second component of the batch of the durable substrate coating of Example 1 can include 139.20 grams of cobalt naphthenate as the metal dryer, 34.80 grams of Ocoate Z™ as an activator component, 34.80 grams of Catalyst 320™ bismuth octoate, and 348.00 grams of odorless mineral spirits.

In operation, the second component can be mixed with the first component just before applying the durable substrate coating onto the substrate.

In one or more embodiments, the durable substrate coating can be applied to roofs, providing a roof coating with an exceptionally long pot life by having a catalyst package that significantly improves the pot life without increasing the cure time or tack-free time.

A short cure time and tack-free time can provide a permanent coating that can be walked on and is resistant to the elements. The durable substrate coating can provide a short cure time and tack-free time while still providing an long pot life, during which mixing and application must occur. In one or more embodiments, the durable substrate coating can have a pot life ranging from about 2 hours to about 5 hours at room temperature.

The durable substrate coating can vulcanize on a roof or other object in a time period ranging from about 4 hours to about 8 hours, such as outside in direct sunlight.

The durable substrate coating can be applied directly over an existing ethylene propylene diene monomer coating or an existing metal roof. The durable substrate coating can be applied using a squeegee, trowel, brush, or the like.

The durable substrate coating can provide a seamless roofing and/or waterproofing membrane having the weathering and performance characteristics of a single ply sheet of ethylene polypropylene diene terpolymer.

The durable substrate coating can be black, white, or another color.

With the durable substrate coating applied on an object, such as a roof, the durable substrate coating can resist moisture, have a low surface temperature, resist thermal expansion and contraction, and remain elastic over a wide range of temperatures.

A durable substrate coating made according to Example 1 can have a tensile strength of about 1,000 psi, a tear strength of about 48 pound-feet/inch (lbf/in), an elongation of about 56 percent, a tack time of about 5 hours, and a cure time of about 12 hours.

Example 2

Order of Addition of the Components for a Batch of Durable Substrate Coating Material To produce a batch of material for making the durable substrate coating, all of the ingredients of the first component, as discussed in Example 1, can be added to a reaction vessel and mixed therein.

For example, first the mineral spirits, the Trilene 65™, the Ultra 1199™ oil, and the Dow Corning 200™ fluid can first be added into the reaction vessel and thoroughly mixed therein.

Next, the Burgess Optiwhite Clay™, the titanium dioxide, the zinc oxide, the MPA 1078X™ solution, and the ultramarine blue can be added into the reaction vessel and thoroughly mixed therein.

Next, the Tween 85™, Lowlight 26™, Lowlight 77™, trimethyl quinoline, and terbutyl peroxy benzoate peroxide can be added to the reaction vessel and thoroughly mixed therein.

Next, the Sartomer 238™ can be added to the reaction vessel, such that all of the first component is in the vessel and thoroughly mixed therein.

During mixing of the first component ingredients, the reaction vessel can be maintained at a temperature ranging from about 50 degrees Celsius to about 60 degrees Celsius to promote mixing of the Trilene 65™ with the other ingredients of the first component. By maintaining the temperature below 60 degrees Celsius, flashing of the first component can be prevented.

The texture of the mixed first component can be smooth, lacking any visible grittiness when spread to a thickness of 10 millimeters.

The first component can be transferred to a container for storage until application onto a substrate.

Then, just before a user is ready to apply the durable substrate coating, the second component can be added to the container and mixed with the first component.

For example, the mineral spirits, cobalt naphtenate, Octoate Z™, and Catalyst 320™ can be added to the first component and mixed therewith to form the durable substrate coating material, which can be applied to a substrate to form a durable substrate coating thereon.

Example 3

An Application of the Durable Substrate Coating

In a test application of the durable substrate coating using a rusty steel fixture as a substrate, loose rust was removed from the rusty steel fixture. However, the surface rust that was not loose was left on the substrate.

The rusty steel fixture was then coated with the durable substrate coating, which was applied directly onto the rusty surface without any further treatment of the rusty surface and without the use of primers thereon. The durable substrate coating was applied to the rusty steel fixture.

The durable substrate coating was then allowed to cure on the rusty steel fixture for 2 weeks.

After curing, adhesion of the durable substrate coating on the rusty steel fixture was measured using the AMST D4541, Standard Test Method For Pull-Off Strength Of Coatings Using Portable Adhesion Testers.

The adhesion was determined on the durable substrate coating on the rusty steel fixture using a 20 millimeter anvil to perform the ASTM D4541 Test.

Four adhesion pressures were obtained, including: 742 pounds-per-square-inch (psi), 796 psi, and 798 psi.

Failure of the durable substrate coating on the rusty steel fixture occurred at the adhesion pressures above due to cohesive failure of the durable substrate coating, cohesive failure of the layer of rust on the rusty steel fixture, or combinations thereof.

Trilene 65™, without the other components of the herein described durable substrate coating, forms only weak bonds to metals, particularly rusty metals. The durable substrate coating can form strong bonds to rusty metal without the use of primers and surface treatments.

Example 4a

Components of an Embodiment of a White Durable Substrate Coating

The durable substrate coating can include can include a first component and a second component.

The first component of the durable substrate coating can include 100.0 parts per hundred parts of resin (phr) of Trilene 65™, a liquid ethylene propylene diene terpolymer available from Lion Copolymer, LLC of Baton Rouge, La.

The first component of the durable substrate coating can include 30.0 phr of a paraffinic oil, such as Ultra 1199™ available from Flint Hills Resources of Wichita, Kans.

The first component of the durable substrate coating can include 65 phr of a kaolin clay as a reinforcing filler, such as Optiwhite™ available from Burgess Pigment of Sandersville, Ga.

The first component of the durable substrate coating can include 40.0 phr of titanium dioxide as a white pigment.

The first component of the durable substrate coating can include 7.5 phr of a zinc oxide activator, such as Kadox 911™, available from NJ Zinc Corp of New Jersey.

The first component of the durable substrate coating can include 5 phr of a 1:1 mixture of a dispersing agent, such as MPA 1078X™ (40 percent) dissolved in toluene available from Elementis Specialties of the United Kingdom.

The first component of the durable substrate coating can include 0.3 phr of an antioxidant, such as Naugard Q™ (TMQ) available from Chemtura of Philadelphia, Pa.

The first component of the durable substrate coating can include can include 0.5 phr a U.V. stabilizer, such as Lowlite 26™ available from Chemtura of Philadelphia, Pa.

The first component of the durable substrate coating can include can include 0.5 phr of a U.V. stabilizer, such as Lowlite 77™ available from Chemtura of Philadelphia, Pa.

The first component of the durable substrate coating can include can include 1.0 of a leveler/emulsifier, such as Tween 85™ available form ICI Americas of Wilmington, Del.

The first component of the durable substrate coating can include can include 7.5 phr of a coagent, such as Sartomer 238™ available from Sartomer Company of Exton. Pa.

The first component of the durable substrate coating can include can include 0.4 phr of a pigment, such as ultramarine blue.

The first component of the durable substrate coating can include can include 126.0 of an odorless mineral spirits.

The first component of the durable substrate coating can include 1.0 phr of a peroxide cross-linker, such as Esperox 10™ available from Chemtura or Luperox P™ available from Arkema of King of Prussia, Pa.

The first component of the durable substrate coating can include 1.0 phr of a silicone oil, such as Dow Corning 200™ available from Dow Corning of Midland, Mich.

The second component of the durable substrate coating can include can include from 3.0 phr to 4.0 phr of a peroxide initiator, such as cobalt naphthenate available from Nuodex Inc. of Dover, Del.

The second component of the durable substrate coating can include 1.0 phr of a zinc octoate, such as Octoate Z™ available from R. T. Vanderbilt.

The second component of the durable substrate coating can include 1.0 phr of a bismuth octoate catalyst, such as Catalyst 320™ available from OM Group (OMG) of Cleveland, Ohio.

The second component of the durable substrate coating can include 10.0 phr of an odorless mineral spirits.

Each liter of the durable substrate coating can weight about 1.1 kilograms.

Example 4B

Preparation of the Components of an Embodiment of a White Durable Substrate Coating The components described in Example 4A can be mixed together to form an embodiment of the durable substrate coating.

First, the mineral spirits, Ultra 1199™ oil, Tween 85™, MPA 1078X™ solution, silicone oil, and the Trilene 65™ can be added to a vessel. In one or more embodiments, the contents of the vessel can then be mixed until well blended to form a uniform mixture.

Next, the titanium dioxide and the kaolin clay can be added to the vessel. In one or more embodiments, the contents of the vessel can then be mixed until well blended to form a uniform mixture.

Next, the Kadox 911™, antioxidant, Lowlite 26™, Lowlite 77™, Sartomer 238™, and ultramarine blue can be added to the vessel and mixed therein to form a uniform mixture.

Finally, the peroxide cross-linker can be added to the vessel and mixed therein to form a uniform mixture; thereby forming the first portion of the durable substrate coating.

During mixing of the components of the first portion, the temperature of the components can be maintained such that loss of solvents due to volatility is avoided.

In one or more embodiments, a batch of durable substrate coating can be from about 4 liters to about 380 liters.

The mixing of the contents of the vessel can form a discharge batch, or resin master batch at a temperature ranging from about 45 degrees Celsius to about 60 degrees Celsius.

The resin master batch can be a liquid ethylene propylene diene terpolymer white coating formulation.

To form the second component, the peroxide initiator, zinc octoate, bismuth octoate catalyst and odorless mineral spirits can be added to another vessel and mixed to form a uniform mixture.

The first component and the second component can be combined using an electrical or air driven mixer to thoroughly mix the second component into the first component. For example, the second component can be mixed into the first component for a time period of 5 minutes or more, forming the durable substrate coating.

The durable substrate coating can be applied to an object, such as a roof, by spraying or using a squeegee, roller, brush, or the like.

In one or more embodiments, the Brookfield Viscosity of the white durable substrate coating can be 24,500 centipoise at 1 rpm with a #62 spindle.

Example 5

Black Durable Substrate Coating

The black durable substrate coating can have a first component and a second component.

The first component in Example 5 can include all of the ingredients of the first component of Example 4A, with the exception of titanium dioxide and ultramarine blue.

Additionally, the first portion of Example 5 can include 70.0 phr of carbon black.

The first component of Example 5 can be prepared in substantially the same manner as described in Example 4B.

The second component in Example 5 can include all of the ingredients of the second component of Example 4A, and can be prepared in substantially the same manner as described in Example 4B.

In one or more embodiments, the Brookfield Viscosity of the black durable substrate coating can be 190,000 centipoise at 2 rpm with a #7 spindle. The Brookfield Viscosity of the embodiments of the durable substrate coating can be varied depending upon the additives, such as pigments, that are added to the first component.

The black durable substrate coating can have a tensile strength ranging from about 250 pounds per square inch (psi) to about 350 psi, and an elongation at break ranging from about 300 percent to about 350 percent.

The second component of the black durable substrate coating can be added to the first component and mixed to a homogenous consistency to form the black durable substrate coating in substantially the same manner as described in Example 4B.

The black durable substrate coating can be applied by toweling, spraying, or the like.

While these embodiments have been described with emphasis on the embodiments, it should be understood that within the scope of the appended claims, the embodiments might be practiced other than as specifically described herein.

What is claimed is:

1. A durable substrate coating comprising:
    a. from 90 weight percent to 98 weight percent of a resin master batch, wherein the resin master batch comprises:
        (i) ethylene propylene diene terpolymer, wherein the ethylene propylene diene terpolymer is from 15 weight percent to 50 weight percent of the durable substrate coating, wherein the ethylene propylene diene terpolymer has:
            1. a viscosity ranging from 10 pascal-seconds to 10,000 pascal-seconds at a temperature of 40 degrees Celsius;
            2. a viscosity ranging from 1 pascal-seconds to 1,000 pascal-seconds at a temperature of 100 degrees Celsius; and
            3. a specific gravity ranging from 0.83 to 0.86;
        (ii) a solvent, wherein the solvent is from 20 weight percent to 50 weight percent of the durable substrate coating;
        (iii) fillers, wherein the fillers are from 20 weight percent to 50 weight percent of the durable substrate coating;
        (iv) a de-tackifier, wherein the de-tackifier is from 0.01 weight percent to 2 weight percent of the durable substrate coating;
        (v) a peroxide curative, wherein the peroxide curative is from 0.1 weight percent to 10 weight percent of the durable substrate coating, wherein the peroxide curative is a peroxide cross-linker having 1.0 phr of the durable substrate coating; and
        (vi) an activator component, wherein the activator component is from 0.5 weight percent to 10 weight percent of the durable substrate coating, and wherein the activator component comprises 1,6, hexane diacrylate;
    b. a metal dryer from 0.5 weight percent to 10 weight percent of the durable substrate coating.

2. The durable substrate coating of claim 1, wherein the solvent is: mineral spirits, another hydrocarbon solvent, an aromatic solvent, or a low volatile organic compound solvent.

3. The durable substrate coating of claim 1, wherein the solvent is a mineral spirits selected from the group consisting of: naphthenic base, aliphatic hydrocarbons, aromatic hydrocarbons, toluene, xylene, oxygenated or halogenated solvents, paraplurobenzyl trifloride, or combinations thereof.

4. The durable substrate coating of claim 1, wherein the resin master batch further comprises plasticizers, and wherein the plasticizers are from 0.1 weight percent to 20 weight percent of the durable substrate coating.

5. The durable substrate coating of claim 4, wherein the plasticizers is a low viscosity oil selected from the group consisting of: highly-hydrotreated white oil, solvent-refined paraffinic oil, naphthenic oil, poly-alpha olefins, or another low volatility hydrocarbon oil.

6. The durable substrate coating of claim 1, wherein the resin master batch further comprises light stabilizers, and wherein the light stabilizer are from 0.1 weight percent to 2.5 weight percent of the durable substrate coating.

7. The durable substrate coating of claim 6, wherein the light stabilizers are: hindered amine light stabilizers, benzophenone competitive absorption light stabilizers, benzotriazole competitive absorption light stabilizers, or combinations thereof.

8. The durable substrate coating of claim 1, wherein the resin master batch further comprises antioxidants, and wherein the antioxidants are from 0.01 weight percent to 1 weight percent of the durable substrate coating.

9. The durable substrate coating of claim 8, wherein the antioxidants are polymerized 1,2-dihydro-2,2,4-trimethylquinoline or 4,4'bis($\alpha,\alpha$-dimethylbenzyl) diphenylamine.

10. The durable substrate coating of claim 1, wherein the resin master batch further comprises a pre-dissolved rheology modifier in toluene in a 1:1 ratio, and wherein the pre-dissolved rheology modifier in toluene is from 0.1 weight percent to 5 weight percent of the durable substrate coating.

11. The durable substrate coating of claim 1, further comprising a pigment, wherein the pigment is from 0.01 weight percent to 20 weight percent of the durable substrate coating.

12. The durable substrate coating of claim 11, wherein the pigment is: a brightener, a fluorescing component, an ultramarine blue pigment, titanium dioxide, or combinations thereof.

13. The durable substrate coating of claim 1, wherein the activator component is zinc octoate or bismuth octoate.

14. The durable substrate coating of claim 1, further comprising a cross-linking catalyst, wherein the cross-linking catalyst is from 0.01 weight percent to 10 weight percent of the durable substrate coating.

15. The durable substrate coating of claim 1, wherein a diene content of the ethylene propylene diene polymer ranges from 0.1 weight percent to 12 weight percent, and wherein a ratio of ethylene to propylene within the ethylene propylene diene terpolymer ranges from 35:65 to 80:20.

16. The durable substrate coating of claim 1, wherein the ethylene propylene diene terpolymer is a liquid with a molecular weight ranging from 10 kiloDaltons to 100 kiloDaltons.

17. The durable substrate coating of claim 1, wherein the fillers are: kaolin clay, calcined clay, talc, calcium carbonate, calcium magnesium carbonate, silica, titanium dioxide, or combinations thereof.

18. The durable substrate coating of claim 1, wherein the peroxide curative is terbutyl peroxy benzoate peroxide blended with 1,6-hexane diacrylate as an activator.

19. The durable substrate coating of claim 1, wherein the metal dryer is cobalt naphthenate or a transition metal alkylate.

20. The durable substrate coating of claim 1, wherein the substrate is: rusted metal, a roof, shingles, a tank, a vessel, a bridge, a support structure, stairs, a catwalk, a structure that holds vessels in place, a hull of a ship, a pipe, or a product requiring resistance to corrosion and weathering.

21. A process for making a durable substrate coating comprising:
   a. making a resin master batch by mixing:
      (i) an ethylene propylene diene terpolymer, wherein the ethylene propylene diene terpolymer is from 15 weight percent to 50 weight percent of the durable substrate coating, wherein the ethylene propylene diene terpolymer has:
         1. a viscosity ranging from 10 pascal-seconds to 10,000 pascal-seconds at a temperature of 40 degrees Celsius;
         2. a viscosity ranging from 1 pascal-seconds to 1,000 pascal-seconds at a temperature of 100 degrees Celsius; and
         3. a specific gravity ranging from 0.83 to 0.86;
      (ii) a solvent, wherein the solvent is from 25 weight percent to 50 weight percent of the durable substrate coating;
      (iii) fillers, wherein the fillers are from 20 weight percent to 50 weight percent of the durable substrate coating;
      (iv) a de-tackifier, wherein the de-tackifier is from 0.01 weight percent to 2 weight percent of the durable substrate coating;
      (v) a peroxide curative, wherein the peroxide curative is from 0.1 weight percent to 10 weight percent of the durable substrate coating, wherein the peroxide curative is a peroxide cross-linker having 1.0 phr of the durable substrate coating; and
      (vi) an activator component, wherein the activator component is from 0.5 weight percent to 10 weight percent of the durable substrate coating, and wherein the activator component comprises 1,6, hexane diacrylate; and
   b. blending in a metal dryer, wherein the metal dryer is from 0.5 weight percent to 10 weight percent of the durable substrate coating, and wherein the resin master batch is from 90 weight percent to 98 weight percent of the durable substrate coating.

22. The process of claim 21, wherein the solvent is mineral spirits, another hydrocarbon solvent, an aromatic solvent, or a low volatile organic compound solvent.

23. The process of claim 21, wherein the solvent is mineral spirits selected from the group consisting of: naphthenic base, aliphatic hydrocarbons, aromatic hydrocarbons, toluene, xylene, oxygenated or halogenated solvents, paraplurobenzyl trifloride or combinations thereof.

24. The process of claim 21, further comprising adding plasticizers to the resin master batch, wherein the plasticizers are from 0.1 weight percent to 20 weight percent of the durable substrate coating.

25. The process of claim 24, wherein the plasticizers is a low viscosity oil selected from the group consisting of: highly-hydrotreated white oil, solvent-refined paraffinic oil, naphthenic oil, poly-alpha olefins, or another low volatility hydrocarbon oil.

26. The process of claim 21, further comprising adding light stabilizers to the resin master batch, wherein the light stabilizers are from 0.1 weight percent to 2.5 weight percent of the durable substrate coating.

27. The process of claim 26, wherein the light stabilizers are: hindered amine light stabilizers, benzophenone competitive absorption light stabilizers, benzotriazole competitive absorption light stabilizers, or combinations thereof.

28. The process of claim 21, further comprising adding antioxidants to the resin master batch, wherein the antioxidants are from 0.01 weight percent to 1 weight percent of the durable substrate coating.

29. The process of claim 28, wherein the antioxidants are polymerized 1,2-dihydro-2,2,4-trimethylquinoline or 4,4'bis ($\alpha,\alpha$-dimethylbenzyl) diphenylamine.

30. The process of claim 21, further comprising adding a pre-dissolved rheology modifier in toluene in a 1:1 ratio to the resin master batch, wherein the pre-dissolved rheology modifier in toluene is from 0.1 weight percent to 5 weight percent of the durable substrate coating.

31. The process of claim 21, further comprising adding a pigment to the resin master batch, wherein the pigment is from 0.01 weight percent to 20 weight percent of the durable substrate coating.

32. The process of claim 31, wherein the pigment is: a brightener, a fluorescing component, an ultramarine blue pigment, titanium dioxide, or combinations thereof.

33. The process of claim 21, wherein the activator component is zinc octoate or bismuth octoate.

34. The process of claim 21, further comprising adding a cross-linking catalyst to the resin master batch, wherein the cross-linking catalyst is from 0.01 weight percent to 10 weight percent of the durable substrate coating.

35. The process of claim 21, wherein a diene content of the ethylene propylene diene polymer ranges from 0.1 weight percent to 12 weight percent and wherein a ratio of ethylene to propylene within the ethylene propylene diene terpolymer ranges from 35:65 to 80:20.

36. The process of claim 21, wherein the ethylene propylene diene terpolymer is a liquid with a molecular weight ranging from 10 kiloDaltons to 100 kiloDaltons.

37. The process of claim 21, wherein the fillers are: kaolin clay, calcined clay, talc, calcium carbonate, calcium magnesium carbonate, silica, titanium dioxide, or combinations thereof.

38. The process of claim 21, wherein the peroxide curative is terbutyl peroxy benzoate peroxide and the activator component is 1,6-hexane diacrylate.

39. The process of claim 21, wherein the metal dryer is cobalt naphthenate or a transition metal alkylate.

40. A process for making a durable substrate coating comprising:
   a. adding from 25 weight percent to 50 weight percent of mineral spirits to:
      (i) from 15 weight percent to 50 weight percent of an ethylene propylene diene terpolymer;
      (ii) from 0.1 weight percent to 20 weight percent of a plasticizer; and
      (iii) from 0.1 weight percent to 2 weight percent of a de-tackifier, and blending to form a solution;
   b. adding to the mineral spirits:
      (i) from 20 weight percent to 50 weight percent of fillers;
      (ii) from 0.5 weight percent to 25 weight percent of a first light stabilizer;
      (iii) from 0.1 weight percent to 5 weight percent of a first pre-dissolved rheology modifier; and
      (iv) from 0.1 weight percent to 5 weight percent of a pigment, forming a first mixture;
   c. further adding to the mineral spirits:
      (i) from 0.1 weight percent to 5 weight percent of a second pre-dissolved rheology modifier;
      (ii) from 0.5 weight percent to 25 weight percent of a second light stabilizer;
      (iii) an antioxidant;
      (iv) a first peroxide curative, forming a second mixture; and
      (v) an activator component comprising 1,6, hexane diacrylate; and
   d. thoroughly mixing the mineral spirits mixture to homogenously disperse each ingredient in the mineral spirits mixture while maintaining the mineral spirits mixture at a temperature below 60 degrees Celsius.

41. The process of claim 40, further comprising adding from 2 weight percent to 10 weight percent of a cross-linking catalyst to the durable substrate coating.

* * * * *